Aug. 6, 1929.   J. F. RUMSEY   1,723,210
METHOD OF PRODUCING CATTLE FEED

Filed Feb. 9, 1926

Joseph F. Rumsey
Inventor

Patented Aug. 6, 1929.

1,723,210

UNITED STATES PATENT OFFICE.

JOSEPH F. RUMSEY, OF OKLAHOMA CITY, OKLAHOMA.

METHOD OF PRODUCING CATTLE FEED.

Application filed February 9, 1926. Serial No. 87,026.

This invention relates to an improved cattle feed and the method of and apparatus for producing the same.

At the present time, cattle fattening on grass or pasture need (in addition to the grass) a high protein feed in order to quicken the fattening process and to make the flesh more solid. Cotton seed cake has been used for this purpose, but does not produce as good flesh or as highly valuable meat, as will cotton seed meal combined with molasses. This combination gives a concentrated feed high in protein, from the cotton seed meal, and yet a more balanced ration due to the carbohydrate value of the molasses.

It is highly impractical to feed loose feed mixtures in troughs to cattle on the range as they cannot be driven to the feed but the feed must be carried to where they are grazing. To throw loose feed on the ground is too great a waste. It is scattered, blown away and tramped into the ground. Also, to throw loose feed directly on the ground, it readily absorbs moisture and spoils.

Hydraulic pressed cotton seed cake, however, has been used on the ground but this cotton seed cake is not only not as good a feed as desired, but also is too hard and ruins the mouths of many cattle, especially older ones, so that their efficiency in grazing is very much reduced. This shortens the life or usefulness of breeding cows.

It is not intended for this invention or feed to be limited to cotton seed meal as linseed meal, peanut meal, or other high protein materials may be substituted or used in place of cotton seed meal or each other, and grain products and by-products may be added to the other ingredients in varying quantities according to the cost of the materials, results desired, and the animals to be fed.

The object of the present invention is to produce an improved cotton-seed feed which will produce a better flesh and which may be distributed on the ground in the same manner as cotton-seed cake, although sufficiently soft as not to be injurious to the mouths of the cattle.

The further object of the invention is in the method of producing the improved cattle feed in broken flakes or in chip form, by a continuous process.

Figure 1:
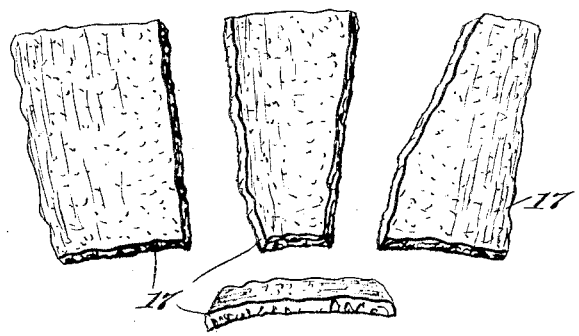
Figure 1 illustrates substantially the form the feed will take in the finished product.
Figure 2:
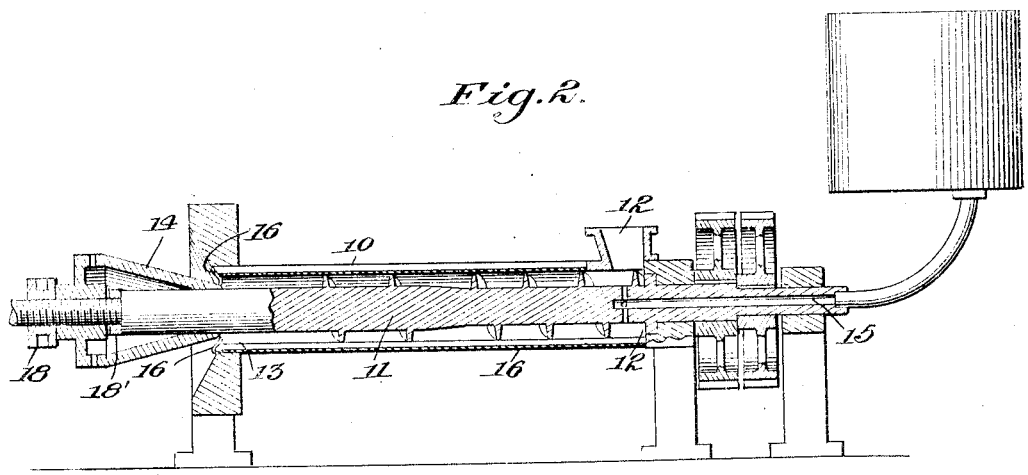
Figure 2 illustrates the manner in which the feed may be produced.

The feed product of this invention is made of cotton-seed meal or other product high in proteins, mixed with a binder such as molasses, and in some instances if desirable, some form of bulky feed such as cotton-seed hulls may be included which will absorb the greater percentage of the molasses. The proportion of the molasses to be used with respect to a given proportion of cotton-seed meal is to be determined by the amount of the materials, except sufficient at least should be used to act as a good binder for the meal. Also, when cotton-seed hulls are incorporated in the mixture, their proportion may be such as desired.

To produce this feed in chip or flake form, the meal mixture is compressed in any suitable manner during which operation the molasses is added, preferably by injecting the same into the mixture. The preferred manner of accomplishing this is by the use of an apparatus consisting of a stationary cylinder 10 in which is longitudinally disposed a worm 11 mounted for rotation in any preferred or conventional manner. The worm or screw 11 is designed to force the material under treatment from the inlet end 12 to the outlet end 13. At the outlet end 13 is arranged a conical member 14 having its smaller end extending toward and adapted to enter into the outlet end of the cylinder. As the material under treatment is passed through the cylinder by the screw and discharged through the outlet end, it is compressed by reason of the conical member 14, partially obstructing the outlet, resulting in the compressed material being delivered in a continuous compact tubular mass, (by reason of the binder) which is expanded by the cone 14, breaking it up in flakes or chips 17 of sizes ranging from several inches to a foot in length and of varying widths, the thickness being of course, regulated by the adjustment of the member 14 with respect to the discharge opening. The adjustment of the member 14 with respect to the outlet opening will, of course, regulate the degree the material is compressed, and this adjustment may be accomplished by threading the cone on the end of the screwshaft 11 and locked in position by the nuts 18.

Of course, this product and process is not limited to expanding a tubular mass, as just described, because it can be well produced in sheet form, which may break up in flakes or chips as it falls from the machine or the sheet may be distorted or diverted out of its path of movement to effect this breaking up.

The meal, as before stated, is held together by the molasses which is supplied to the mixture in any suitable manner, or at the inlet end of the apparatus, such for instance as by a passage 15 through the shaft of the screw 11. The interior surface of the cylinder 10 is provided with suitable grooves 16 which will allow any excess of the binder to flow off.

It will thus be seen that the compressed material, by reason of the binder used, will be discharged from the machine in the form of flakes or chips and by a continuous operation, greatly reducing its cost compared with similar products now used. At this stage of the process the product can be dried to reduce the moisture contents and allow sacking without the chips sticking together. If necessary the chips may be dusted with a fine meal dust the excess of which can be removed by running the product over a perforated shaker or through a revolving perforated reel. This operation will also separate out the small pieces before packing the flakes in sacks to give the finished product a more uniform size, thus avoiding waste when feeding on the ground. When these finer pieces and crumbs are thus separated, they make an excellent feed for poultry and dairy cows. For this purpose it is sometimes best to grind to a fine meal.

The larger flakes or chips, besides being a better result-getting feed for cattle, can be distributed on the ground for use in open country by reason of its form, and is comparatively soft, with respect to hydraulic pressed material or cakes, eliminating the injurious effects upon the mouths, gums and teeth of the cattle.

The degree of compression contemplated for the feed of this invention is only such as will cause the material to adhere in a homogeneous mass with the binder and not to form a hard cake. The chips or flakes after being dry are ordinarily sufficiently soft as to be bent or broken in the hands and consequently, are readily masticated without any abrasive effect on the tissue of the mouth or gums of the cattle.

Having thus described the invention in the form and manner in which it is at present produced, it is to be understood that the invention is only to be limited by the terms of the claims and that such variations in the forms of the products and in the steps of the process may be made, which fall within the scope of the claims.

What is claimed is:

1. The process of producing a soft cattle feed consisting of compressing a mixture of edible materials into a homogeneous mass, then distorting said compressed mass to cause it to break up in flakes, and then permitting the flakes to dry.

2. The process of producing a soft cattle feed consisting of compressing a mixture of edible materials into a homogeneous tubular mass, then expanding said tubular mass causing it to break up in flakes.

3. The process of producing a soft cattle feed consisting in moving a mixture of edible materials in a path and compressing the mixture into a homogeneous tubular mass while moving in said path, and then diverting the path of movement of said compressed mass causing the same to break up in flakes.

4. The process of producing a soft edible cattle feed consisting of mixing edible materials including cotton seed meal and molasses, the ingredients being in proportions to produce a plastic mass, compressing the mass so produced to a degree where it assumes homogeneity without becoming hard but readily breakable and then distorting said compressed mass to cause it to break up in flakes, as and for the purpose set forth.

In testimony whereof I have hereunto set my hand.

JOSEPH F. RUMSEY.